United States Patent [19]

Zarezankov et al.

[11] 3,713,739
[45] Jan. 30, 1973

[54] METHOD FOR GAUGING THE LINEAR CROSS-SECTIONAL DIMENSIONS OF MOVING ROLLED PRODUCTS AND AN APPARATUS FOR ITS REALIZATION

[75] Inventors: Georgy Khristovich Zarezankov; Alexander Semenovich Khokhlov; Valery Ivanovich Cherepnev; Nikolai Sergeevich Druzhinin; Konstantin Nikolaevich Budtolaev, all of Moscow, U.S.S.R.

[73] Assignee: Vsesojuzny nauchno-issledovatelsky i proektno-konstruktorsky institut metallurgicheskogo mashinostroenia, Moscow, U.S.S.R.

[22] Filed: Feb. 18, 1971

[21] Appl. No.: 116,546

[52] U.S. Cl. .............356/163, 250/219 TH, 356/167
[51] Int. Cl. ...............................................G01b 11/06
[58] Field of Search.250/219 WD, 219 TH; 356/167, 356/156, 163, 164, 23

[56] References Cited

UNITED STATES PATENTS

| | | | |
|---|---|---|---|
| 3,619,070 | 11/1971 | Pirlet | 356/163 |
| 3,218,389 | 11/1965 | Reed | 356/156 |
| 2,674,915 | 4/1954 | Anderson | 250/219 WD |
| 3,222,979 | 12/1965 | Webster | 250/219 WD |
| 2,674,917 | 4/1954 | Summerhayes Jr. | 250/219 WD |
| 3,178,510 | 4/1965 | Rosin et al. | 356/163 |
| 3,565,531 | 2/1971 | Kane et al. | 250/219 TH |
| 2,574,119 | 11/1951 | Mottu | 356/163 |
| 3,016,464 | 1/1962 | Bailey | 250/219 TH |
| 3,187,185 | 6/1965 | Milnes | 356/156 |

FOREIGN PATENTS OR APPLICATIONS 245,680  7/1963  Australia.........................356/156

Primary Examiner—Ronald L. Wibert
Assistant Examiner—Jeff Rothenberg
Attorney—Holman & Stern

[57] ABSTRACT

The surfaces of a rolled product the distance between which is being gauged are illuminated with light pulses sent out in the form of a fine line. The light lines reflected from the surfaces are projected onto the screen of a single electron-optical storage element in such a manner that the distance between the line images is proportional to the distance being gauged. The distance between the images of the fine lines on the screen is measured during the time interval between consecutive light-impulse transmissions.

An apparatus for gauging the linear cross-sectional dimensions of a rolled product comprises a slit-diaphragm impulse light source to form a fine light line, and an optical system to present the reflections from the opposite sides of the product in a common plane. This plane contains the screen of an electron-optical storage element. The apparatus comprises an electronic means for measuring the distance between the lines on the screen.

2 Claims, 3 Drawing Figures

METHOD FOR GAUGING THE LINEAR CROSS-SECTIONAL DIMENSIONS OF MOVING ROLLED PRODUCTS AND AN APPARATUS FOR ITS REALIZATION

The present invention relates to methods and apparatus for gauging the linear dimensions of products and, more specifically, to a method for gauging the cross-sectional dimensions of moving rolled products and an apparatus for its realization.

In the prior art, there is a photo-electronic method for gauging linear dimensions, say the thickness, of a moving rolled product, consisting in that a continuously emitted beam of light in the form of a spot is made to strike each of the opposite surfaces of the rolled product, and an image of the reflection from each spot is projected onto the screens of electron-beam tubes EBT. The distance between the images of the spot reflections on two screens gives a measure of the thickness of the rolled product.

A method for the realization of this prior-art method comprises two identical units monitoring the positions of selected areas on the opposite surfaces of the moving rolled product, the distance between these areas being the sought dimensions. Each unit contains a CW laser, say a gas laser, the focused emission of which illuminates a dot area on the surface at an angle to the normal, and an optical system projecting the illuminated dot area onto the screen of an EBT. The operator locates the dot on the screen with a scanning sweep and counts the number of lines from the start of a frame to the line running through the image of the dot area on the EBT screen. The other unit located on the opposite side of the rolled product is built and operates in the same way. The sought linear cross-sectional dimension is proportional to the sum of the line counts determined as described with two EBT's. This prior-art apparatus is used to gauge hot slabs moving at a speed of one or two meters per second.

This prior-art method suffers from the following disadvantages.

The use of continuous light emission in conjunction with electron-beam tubes with a marked time lag (such as the vidicon, the image orthicon, and the like) results in that lateral displacements of the moving rolled product being gauged produce a blurred image on the screen, and this impairs the accuracy of gauging.

Since light beams are made to illuminate two dot areas, the dimension of a rolled product is gauged only between those dot areas and not over the entire section of the product.

With two electron-beam tubes used, there may be additional sources of error in gauging because of difference in electric characteristics, such as sensitivity, etc., between the tubes.

Last but not least, the accuracy of gauging may further be impaired by the electron-beam tubes moving in their shock-mounts.

An object of the present invention is to provide a method for gauging the cross-sectional dimensions of rolled products by which the surfaces of the product are illuminated in such a manner that the dimensions of the product can be gauged over its entire width with a high accuracy, and also to provide an apparatus to realize the method disclosed herein.

With this object in view, the invention resides in that in gauging the linear cross-sectional dimensions of a moving rolled product, according to the invention, areas on the surfaces of the product the distance between which is being gauged are illuminated with light pulses sent out in the form of a fine line, an image of the fine line reflected from each area on the surfaces is projected onto the screen of a single electron-beam storage tube, and the distance between the images of the fine lines is determined on the basis of the time intervals between the transmitted pulses.

Illumination of the rolled product with a fine light line enables its linear dimensions to be gauged over its entire width (thickness) and at any point. Besides, since the images of the fine light lines are presented all on the screen of the same electron-beam storage tube, any errors associated with spread in parameters between tubes are eliminated.

In order to realize the method disclosed herein, use may be made of an apparatus comprising a light source to illuminate the surfaces of the rolled product being gauged, and an optical system to present the radiation reflected by the surfaces of the rolled product in a single plane. According to the invention, this apparatus uses a prior-art slit-diaphragm impulse light source to form a fine light line, and the screen of an electron-optical storage element placed in the plane where images of the reflected radiation are to be combined in order to register and them to measure the distance between the images of the fine light lines during the interval between transmitted pulses.

The invention will be more fully understood from the following description of a preferred embodiment of the invention when read in connection with the accompanying drawings wherein.

Figure 3:
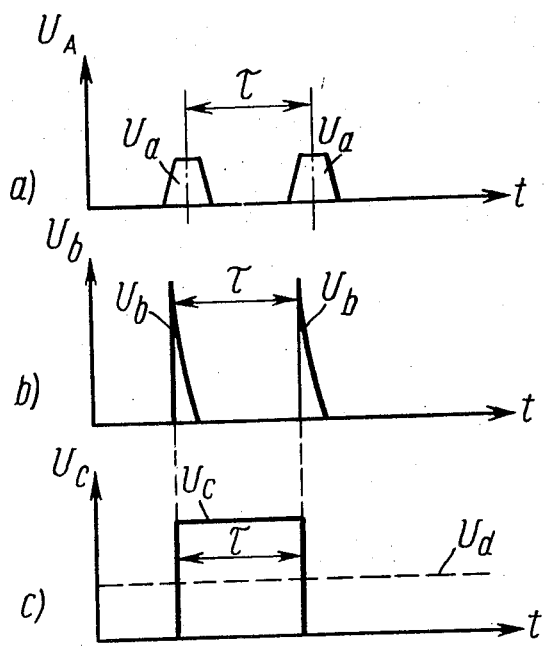

FIG.3 a, b and c are time waveforms of electric signals of the apparatus disclosed herein.

Figure 1:
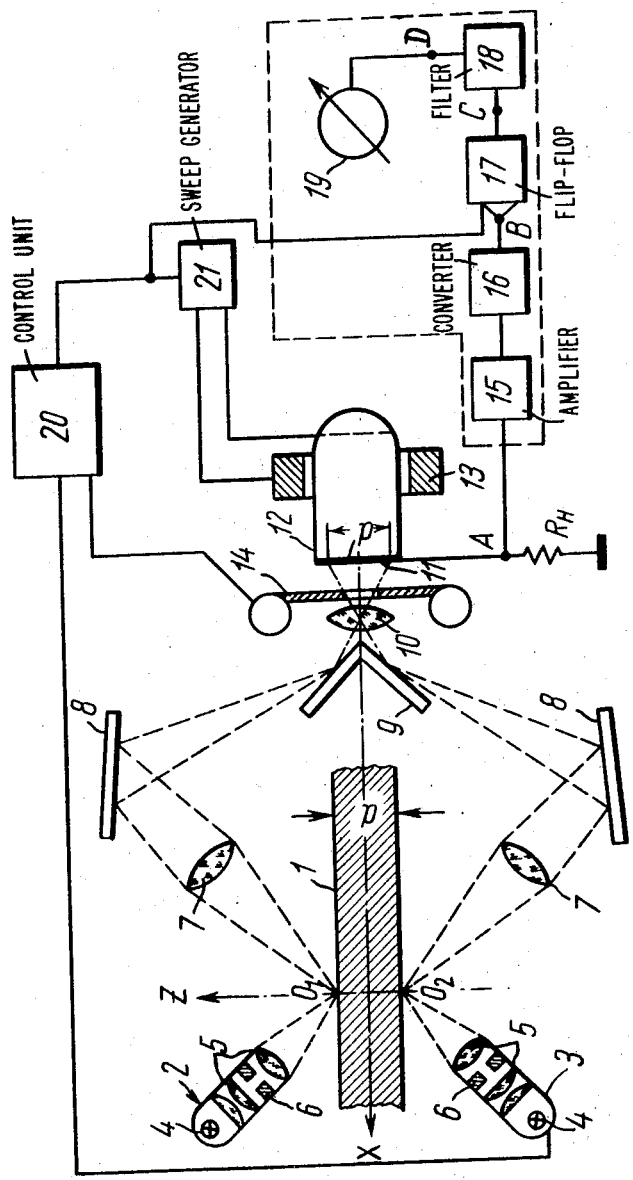
FIG. 1 shows the arrangement of the electron-optical system of an apparatus according to the invention, to realize the method disclosed herein.
Figure 2:
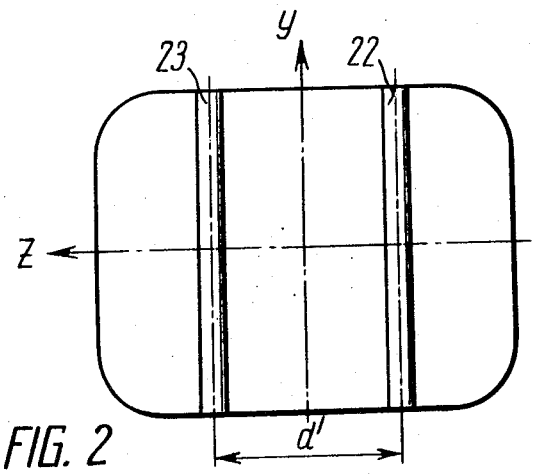
FIG. 2 shows the screen of an electron-optical storage element and the position of the images of fine-line reflections.

Referring to FIG. 2, there are illuminators 2 and 3 set up on each side of a cold or hot rolled product 1 which is moving along the X-axis and the dimensions $d$ of which is to be gauged. Each illuminator comprises an impulse lamp 4, lenses 5, and a slit diaphragm 6. The illuminators produce fine light lines, hereafter referred to as light markers, which are thrown onto the opposite sides of the rolled product 1. In the plane of FIG. 1, these light markers are represented by the points $O_1$ and $O_2$. On being reflected from the surfaces of the rolled product 1, the light markers are projected by an optical system (objectives 7, deflecting mirrors 8 and 9, and objective 10) onto the screen 11 of an electron-optical storage element 12 fitted with a focusing and deflection system 13. In this optical system, the objective 10 is followed by an optical shutter 14.

The apparatus has an electronic measuring system to determine the distance between the images of the markers on the screen 11, of the electron-optical storage element 12. This system comprises a video amplifier 15, a selective converter 16 to transform the video signals into short signals, a flip-flop 17, a low-pass filter 18, and an indicator 19 having a scale graduated in linear units.

There is also a programmed-control unit 20 which effects control of the apparatus, namely, to turn on and off the illuminator 4 and the shutter 14, to apply power to the electron-optical storage element 12 and to a sweep generator 21 which scans the image on the screen of the electron-optical storage element. Just as the scanning beam is turned off, the unit 20 sends out a signal to bring the diaphragm 14 into the field of view of the objective 10, thereby keeping any stray light from the element 12.

Consider operation of the apparatus disclosed herein.

A signal from the control unit 20 simultaneously turns on the lamps 4 of the illuminators 2 and 3 which form the light markers illuminating the opposite sides of the rolled product 1. The objectives 7, the deflecting mirrors 8 and 9, and the objective 10 project the reflections of the two light markers onto the screen 11 of the electron-optical storage element 12. If the thickness $d$ within the section being gauged remains constant, two parallel light lines 22 and 23 (FIG. 2) appear on the screen 11, the distance $d'$ between which is proportional to the measured distance $d$. The screen 11 stores the position of these two lines until the next flash of the lamp 4. If the thickness of the rolled product within the measured section varies, two slant or broken lines are formed on the screen. In this case, the distance between the individual points of these lines is linearly related to the respective dimension of the rolled product 1. After the flash of the impulse lamps 4 ceases, the shutter 14 closes, thereby keeping stray light signals, including the infra-red emission of the hot product, from reaching the screen 11, and a signal from the unit 20 triggers the sweep generator 21. This generator produces a line sweep which scans the screen 11 along the Z-axis (FIG. 2). When the beam of the line sweep passes through the lines 22 and 23, two video pulses $V_a$ (FIG. 3a) are developed across the load resistor $R_H$, the time interval T between which is related to the distance $d'$ and, as a consequence, to the dimension $d$. These video pulses go to the amplifier 15 and then to the converter 16 which transforms them into short pulses $U_b$ (FIG. 3b) and, at the same time, suppresses low-frequency noise, notably the signal due to the dark current of the screen of the element 12.

The pulses $U_b$ trigger the flip-flop 17 which furnishes rectangular pulses $U_c$ (FIG. 3c) with duration $\tau$. The frequency of the line sweep is sufficiently high to product a periodic sequence of pulses $U_c$ the direct component $U_d$ of which is isolated by the filter 18. This direct component is measured by the indicator 19. Since the direct component of the periodic pulse sequence is proportional to the duration $\tau$, the readings of the indicator are proportional to the width (thickness) $d$ of the rolled product.

This brings one cycle of gauging to an end. To initiate the next cycle, the unit 20 generates a signal turning on the lamps 4, and the next segment of the moving rolled product is gauged.

To gauge the thickness of the rolled product in various sections, when the lines 22 and 23 are, say, slant, the line sweep should be shifted either up or down along the Y-axis (FIG. 2).

It should be borne in mind that when use is made of an electron-optical storage element capable of reproducing its own record, the distance between the images of the light markers may be determined visually.

What is claimed is:

1. A method for gauging the linear cross-sectional dimensions of a moving rolled product, said method comprising the steps of: transmitting at intervals pulsed light in the form of a fine line to simultaneously illuminate areas on opposite surfaces of the rolled product, the distance between which areas is being gauged; projecting images of the fine light lines reflected from the surfaces of the rolled product onto the screen of an electron-optical storage element such that the distance between said images on the screen of the storage element is proportional to the distance being gauged; and measuring the distance between the images produced on the screen of the electron-optical storage element within the interval between transmitted pulses.

2. An apparatus for gauging the linear cross-sectional dimensions of a moving rolled product, said apparatus comprising slit-diaphragm pulsed light source means for generating and transmitting a fine light line simultaneously onto areas on opposite sides of the rolled product, the distance between which areas is being gauged; optical system means for projecting images of the fine light lines reflected from the rolled product into a common plane; an electron-optical storage element having a screen, the screen of said element being placed in the plane in which said images of the fine light lines are projected, said screen registering the position of said reflected images; and means for measuring the distance between the images of the fine lines on said screen.

* * * * *